(12) United States Patent
Ferguson et al.

(10) Patent No.: US 9,387,854 B1
(45) Date of Patent: *Jul. 12, 2016

(54) USE OF ENVIRONMENTAL INFORMATION TO AID IMAGE PROCESSING FOR AUTONOMOUS VEHICLES

(71) Applicant: Google Inc., Mountain View, CA (US)

(72) Inventors: David I. Ferguson, San Francisco, CA (US); Wan-Yen Lo, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,979

(22) Filed: Aug. 19, 2015

Related U.S. Application Data

(63) Continuation of application No. 13/925,795, filed on Jun. 24, 2013, now Pat. No. 9,145,139.

(51) Int. Cl.
*G06F 17/10* (2006.01)
*B60W 30/09* (2012.01)
*G05D 1/00* (2006.01)

(52) U.S. Cl.
CPC ............ *B60W 30/09* (2013.01); *G05D 1/0088* (2013.01); *B60W 2420/42* (2013.01); *B60W 2550/10* (2013.01)

(58) Field of Classification Search
None
See application file for complete search history.

(56) References Cited

U.S. PATENT DOCUMENTS

| | | | | |
|---|---|---|---|---|
| 8,027,029 B2 * | 9/2011 | Lu | .......................... | G01S 7/4802 356/28 |
| 8,315,796 B2 * | 11/2012 | Yamaguchi | ............ | G01C 21/36 340/995.2 |
| 2009/0228184 A1 * | 9/2009 | Ueyama | .............. | B60W 30/095 701/96 |
| 2010/0080419 A1 * | 4/2010 | Okugi | ................ | G06K 9/00791 382/104 |
| 2012/0083959 A1 * | 4/2012 | Dolgov | ................ | G05D 1/0214 701/23 |
| 2012/0310465 A1 * | 12/2012 | Boatright | .............. | B60Q 1/346 701/25 |
| 2012/0323444 A1 * | 12/2012 | Rieger | .................. | B60W 40/11 701/37 |

FOREIGN PATENT DOCUMENTS

| | | |
|---|---|---|
| EP | 1901259 A1 | 3/2008 |
| WO | 2011160672 A1 | 12/2011 |
| WO | 2013056884 A1 | 4/2013 |

OTHER PUBLICATIONS

Extended European search report from corresponding European Patent Application No. 14817319.8 mailed Apr. 19, 2016.

* cited by examiner

*Primary Examiner* — Thomas Tarcza
*Assistant Examiner* — Garrett Evans
(74) *Attorney, Agent, or Firm* — McDonnell Boehnen Hulbert & Berghoff LLP

(57) ABSTRACT

An autonomous vehicle may be configured to use environmental information for image processing. The vehicle may be configured to operate in an autonomous mode in an environment and may be operating substantially in a lane of travel of the environment. The vehicle may include a sensor configured to receive image data indicative of the environment. The vehicle may also include a computer system configured to compare environmental information indicative of the lane of travel to the image data so as to determine a portion of the image data that corresponds to the lane of travel of the environment. Based on the portion of the image data that corresponds to the lane of travel of the environment and by disregarding a remaining portion of the image data, the vehicle may determine whether an object is present in the lane, and based on the determination, provide instructions to control the vehicle in the autonomous mode in the environment.

20 Claims, 10 Drawing Sheets

Right Side View

Front View

Back View

Top View

USE OF ENVIRONMENTAL INFORMATION TO AID IMAGE PROCESSING FOR AUTONOMOUS VEHICLES

CROSS-REFERENCE TO RELATED APPLICATION

The present application is a continuation of U.S. patent application Ser. No. 13/925,795, filed on Jun. 24, 2013, and entitled "Use of Environmental Information to aid Image Processing for Autonomous Vehicles," which is herein incorporated by reference as if fully set forth in this description.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the directional controls of the vehicle to cause the vehicle to navigate around the obstacle.

SUMMARY

Within examples, methods and systems are provided for object detection based on known environmental information of an environment for an autonomous vehicle.

In a first aspect, a method is provided. The method includes receiving, using a processor, image data indicative of an environment from at least one sensor of a vehicle. The vehicle may be configured to operate in an autonomous mode in the environment, and the vehicle may be substantially in a lane of travel of the environment. The method also includes comparing environmental information indicative of the lane of travel to the image data so as to determine a portion of the image data that corresponds to the lane of travel of the environment. The method additionally includes determining whether an object is present in the lane of travel based on the portion of the image data that corresponds to the lane of travel of the environment and by disregarding a remaining portion of the image data. The remaining portion of the image data may include image data other than the portion of the image data that corresponds to the lane of travel. The method further includes based on the determination, providing instructions to control the vehicle in the autonomous mode in the environment.

In a second aspect, a vehicle is provided. The vehicle includes a sensor configured to receive image data indicative of an environment. The vehicle may be configured to operate in an autonomous mode in the environment, and the vehicle may be substantially in a lane of travel of the environment. The vehicle also includes a computer system. The computer system may be configured to compare environmental information indicative of the lane of travel to the image data so as to determine a portion of the image data that corresponds to the lane of travel of the environment. The computer system may also be configured to determine whether an object is present in the lane of travel based on the portion of the image data that corresponds to the lane of travel of the environment and disregarding a remaining portion of the image data. The remaining portion of the image data may include image data other than the portion of the image data that corresponds to the lane of travel. The computer system may additionally be configured to based on the determination, provide instructions to control the vehicle in the autonomous mode in the environment.

In a third aspect, a non-transitory computer readable medium having stored therein instructions that when executed by a computer system in a vehicle, cause the computer system to perform functions is disclosed. The functions include receiving image data indicative of an environment from at least one sensor of the vehicle. The vehicle may be configured to operate in an autonomous mode in the environment, and the vehicle may be substantially in a lane of travel of the environment. The functions also include comparing environmental information indicative of the lane of travel to the image data so as to determine a portion of the image data that corresponds to the lane of travel of the environment. The functions additionally include determining whether an object is present in the lane of travel based only on the portion of the image data that corresponds to the lane of travel of the environment and by disregarding a remaining portion of the image data. The remaining portion of the image data may include image data other than the portion of the image data that corresponds to the lane of travel. The functions further include based on the determination, providing instructions to control the vehicle in the autonomous mode in the environment.

In a fourth aspect a system is disclosed. The system includes a means for receiving image data indicative of an environment from at least one sensor of a vehicle. The vehicle may be configured to operate in an autonomous mode in the environment, and the vehicle may be substantially in a lane of travel of the environment. The system also includes a means for comparing environmental information indicative of the lane of travel to the image data so as to determine a portion of the image data that corresponds to the lane of travel of the environment. The system additionally includes a means for determining whether an object is present in the lane of travel based on the portion of the image data that corresponds to the lane of travel of the environment and by disregarding a remaining portion of the image data. The remaining portion of the image data may include image data other than the portion of the image data that corresponds to the lane of travel. The system further includes a means for based on the determination, providing instructions to control the vehicle in the autonomous mode in the environment.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
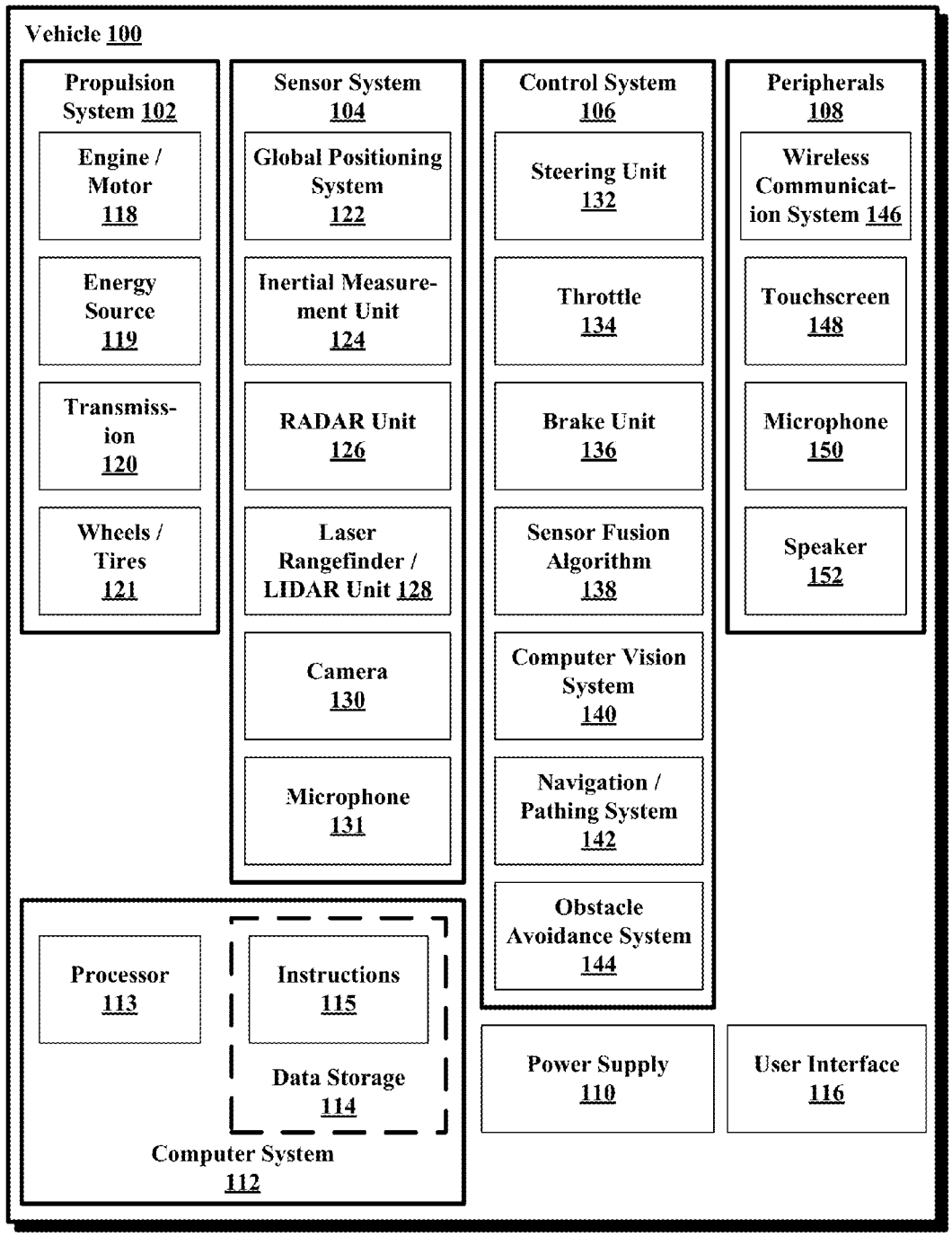
FIG. 1 is a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

For vehicles operating in an autonomous mode, knowing or recognizing the presence of objects in a current lane of the vehicle may be helpful. Generally, to detect the presence of objects autonomous vehicles may utilize various sensors including LIDAR and RADAR to periodically scan the environment in which the vehicles are operating. At times, it may be desirable to use cameras to detect the presence of objects as cameras are configured to observe objects at long ranges and may be configured not to differentiate between metallic and non-metallic objects. Similar to LIDAR and RADAR, cameras may periodically scan the environment in which the vehicles are operating, obtain image data, and process the imaged data to determine the presence of foreign objects. However, processing image data may be computationally expensive and may be prone to image noise.

Within examples, an autonomous vehicle is provided that is configured to receive and utilize data of an environment (e.g., an image map) to facilitate image processing. Disclosed herein are methods and systems that relate to an autonomous vehicle processing image data and image maps representing an environment of the vehicle to more efficiently and accurately detect the presence of objects. Disclosed embodiments relate to an autonomous vehicle that may be configured to capture image data of a particular lane in an environment in which the vehicle is operating. The image data may include information about the environment the vehicle is operating in including the information regarding the particular lane the vehicle is operating in. Using this information, the vehicle may detect objects within relevant areas by, for example, ignoring the irrelevant areas and focusing on the portion of the image data that represents the particular lane.

In an example scenario, an autonomous vehicle may obtain, using a camera coupled to the vehicle, an image while the vehicle is traveling in a particular lane on a highway. In such a scenario, any obstacles (e.g., road flares, cones, other vehicles, etc.) that might interfere with the travel of the vehicle may be important to the vehicle, and the vehicle would, ideally, like to efficiently and accurately detect any such objects that are within the particular lane of travel. To detect the objects, the vehicle may determine an image map that defines or is indicative of the environment in which the vehicle is traveling—in the present scenario, an image map that defines and provides details of the highway. Using the map of the highway, the vehicle may determine a portion of the image data that represents the particular lane on the highway in which the vehicle is operating (e.g., by comparing the image map to the image data, determining lane extents, and projecting the extents of the lane into the captured image data). The determined portion of the image data may be processed by the vehicle to detect the presence of the objects or other things. The remaining portions of the image data may be ignored by the vehicle.

Utilizing the methods and systems described herein may facilitate the task of image processing in an autonomous vehicle, possibly avoiding some of the difficulties that may be present in more typical camera processing approaches.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
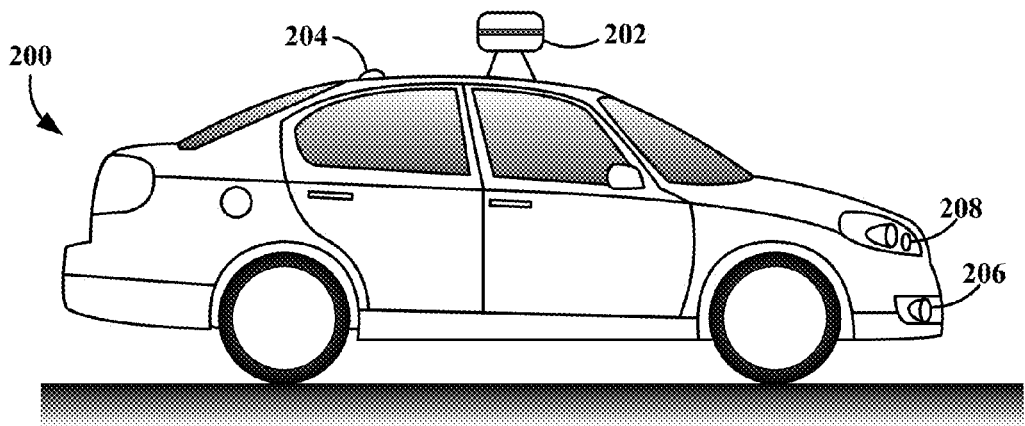
FIG. 2 is a vehicle, in accordance with an example embodiment.
Figure 2:
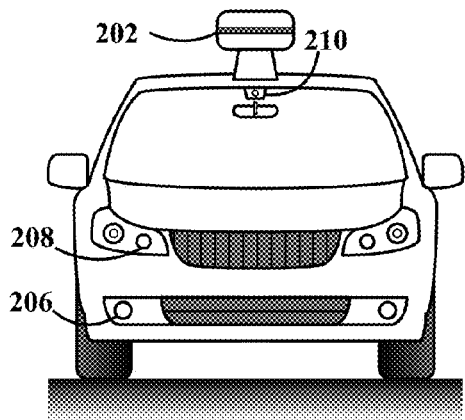
Figure 2:
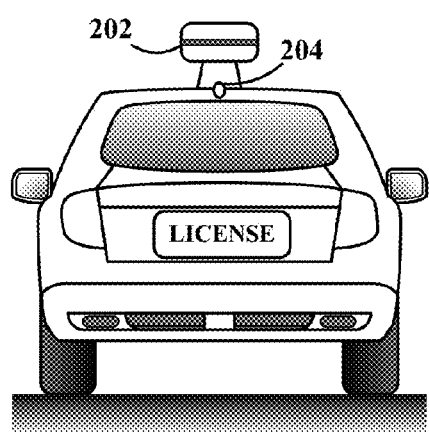
Figure 2:
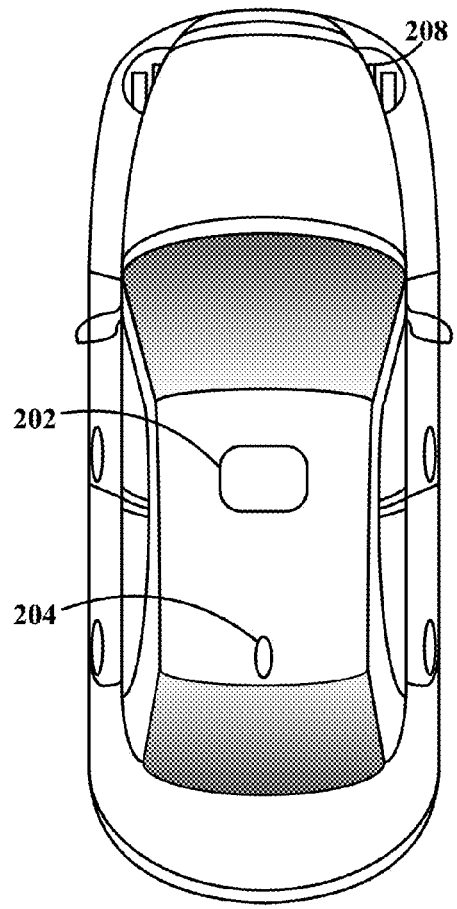

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3A:
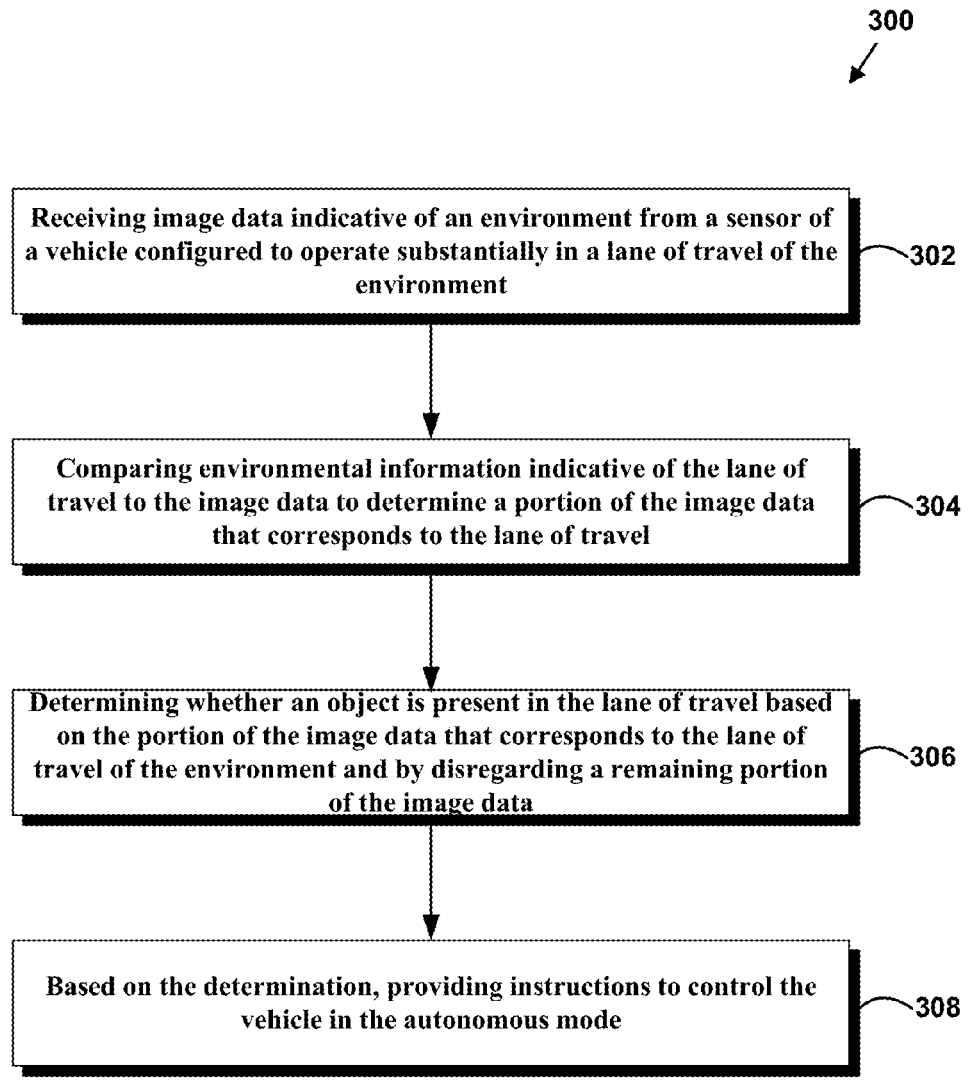
FIG. 3A illustrates a block diagram of a method, in accordance with an example embodiment.

In FIG. 3A, a method 300 is provided for using known environmental information to facilitate object detection through image processing. The vehicle described in this method may be vehicle 100 and/or vehicle 200 as illustrated and described in reference to FIGS. 1 and 2, respectively. For example, the processes described herein may be carried out by camera 130 mounted to an autonomous vehicle (e.g., vehicle 200) in communication with computer system 112, sensor fusion algorithm 138, and/or computer vision system 140.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart shown in FIG. 3. Where used, program code can be stored on any type of computer-readable medium (e.g., computer-readable storage medium or non-transitory media, such as the data storage 114 described above with respect to computer system 112 and/or a computer program product 500 described below), for example, such as a storage device including a disk or hard drive.

In addition, each block of the flowchart shown in FIG. 3A (or FIG. 3B) may represent circuitry that is wired to perform the specific logical functions in the process. Unless specifically indicated, functions in the flowchart shown in FIGS. 3A-3B may be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure, such as the additional flowchart shown in FIG. 3B.

Figure 4A:
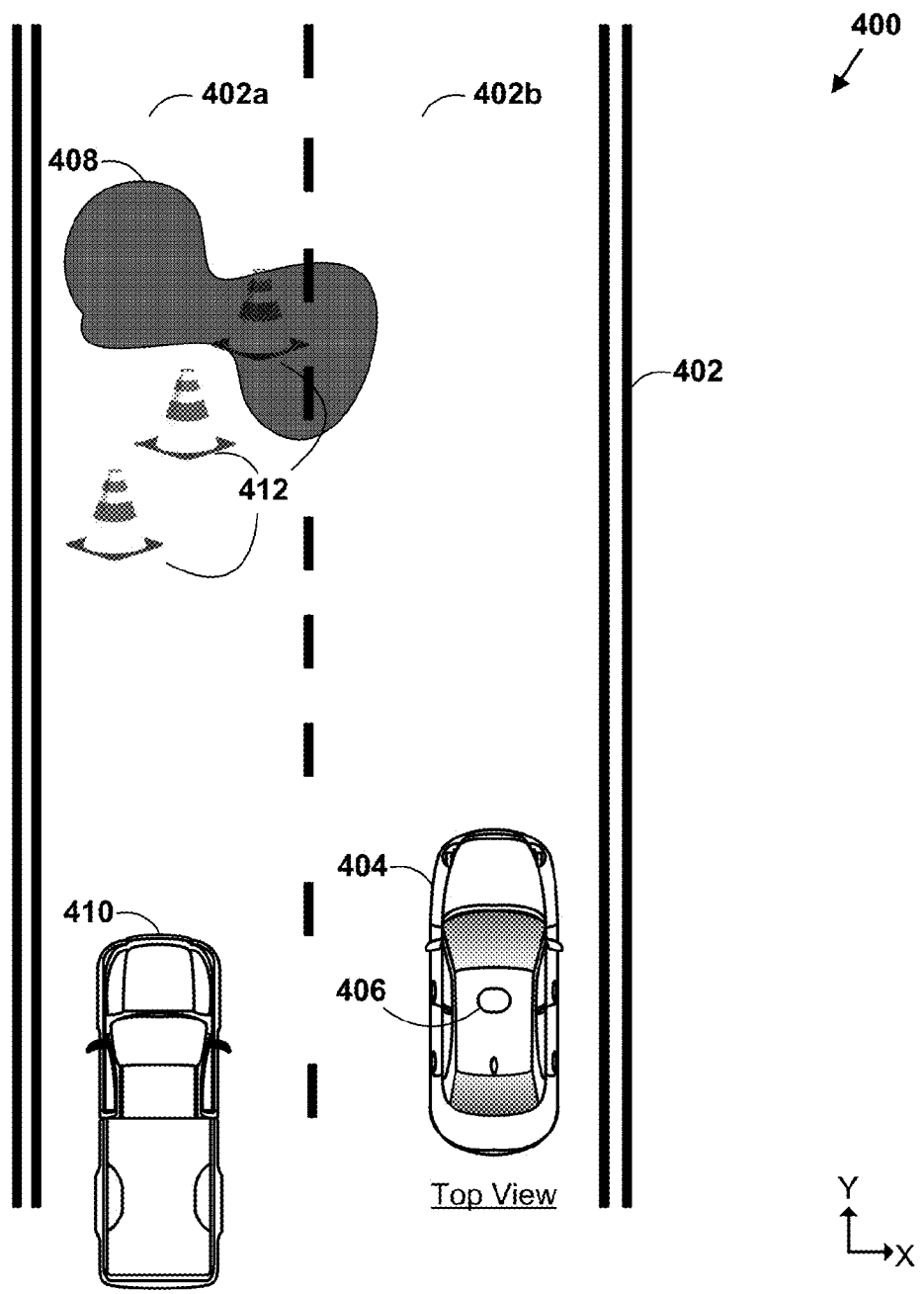
FIG. 4A is a top view of an autonomous vehicle operating in an environment, in accordance with an example embodiment.

Initially at block 302, method 300 of FIG. 3A includes receiving image data indicative of an environment from a sensor of a vehicle configured to operate substantially in a lane of travel of the environment. The vehicle may be the vehicle described in reference to FIGS. 1 and 2 and may be configured to operate in an autonomous mode in the environment. The environment may be any environment in which the vehicle may operate autonomously in a lane of travel. Such environments may include a highway, a road, or an interstate to name a few. In one example, referring to FIG. 4A, vehicle 404 may be operating in an environment 400 including a road 402, oil spill 408, truck 410, and cones 412. In environment 400, the vehicle may be substantially operating in a lane of travel 402b, and oil spill 408, truck 410, and cones 412 may be positioned substantially in lane 402a.

The features of environment 400 may be both permanent and non-permanent. For example, oil spill 408, truck 410, and cones 412 may be non-permanent and may represent a current status of environment 400 at a particular time (e.g., a particular day and year). Conversely, road 402 and lanes 402a, 402b may be permanent features. In other words, road 402 along with lanes 402a, 402b may be a fixed portion of environment 400 and may be present in environment 400 unless the environment is permanently changed (e.g., a reconstruction of road 402). Other permanent and non-permanent features may be included in environment 400 as well.

While operating in an environment, a vehicle may receive image data indicative of a current representation of the environment in which it is operating. For example, vehicle 404 may operate at least one sensor of sensor unit 406, such as a camera, similar to or the same as camera 130, to receive image data indicative of environment 400. Image data 420, shown in FIG. 4B, represents example image data indicative of a portion of environment 400.

Figure 4B:
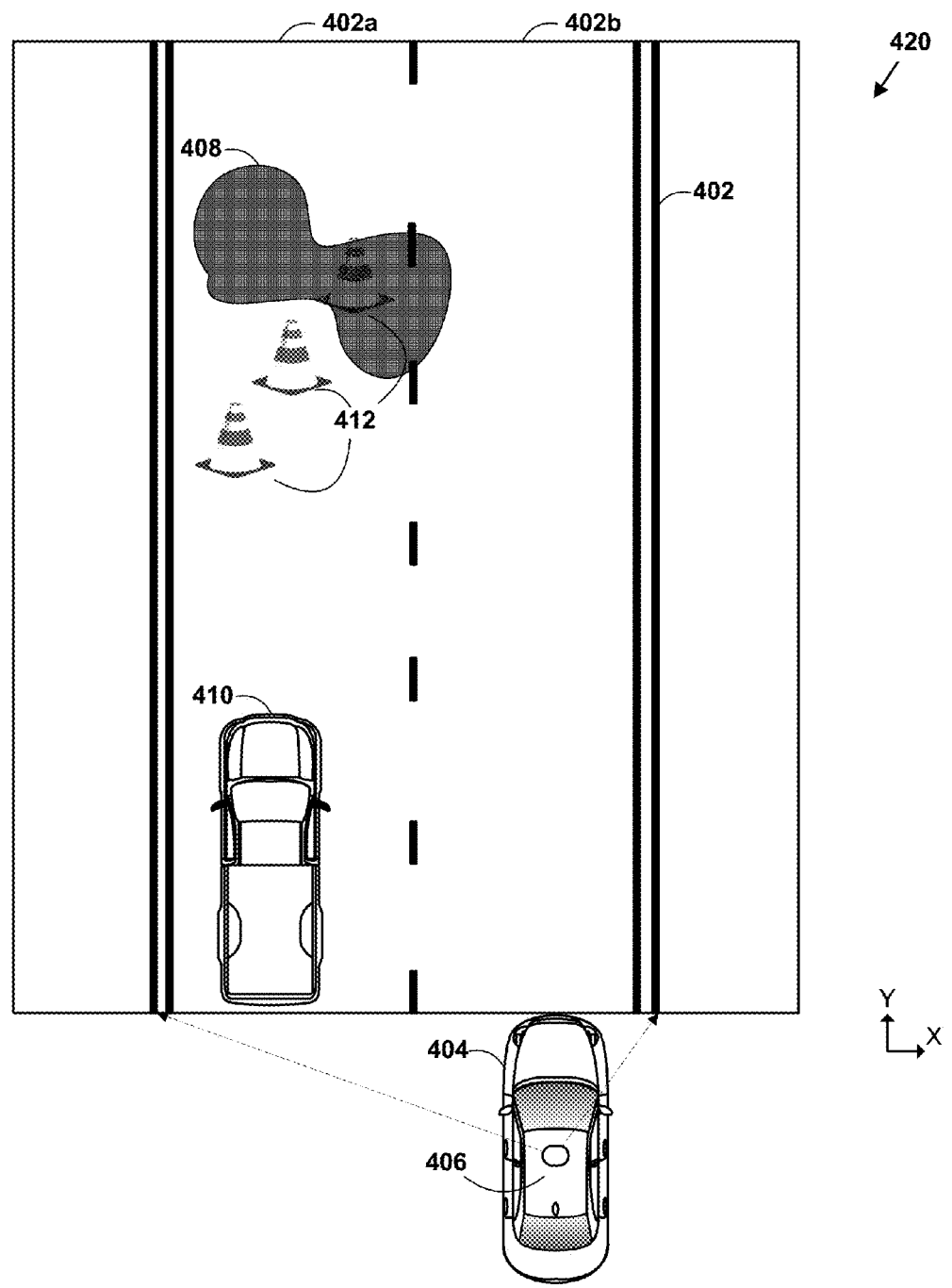
FIG. 4B is a schematic illustration of example image data obtained by the autonomous vehicle of FIG. 4A, in accordance with an example embodiment.

Note in FIG. 4B image data 420 captured, for example, by a camera of sensor unit 406 of vehicle 404, is the image shown above the dotted arrows and does not include vehicle 404. Vehicle 404 is shown for explanation purposes only and, in this example, is not intended to be part of image data 420. In practice, image data 420 may be obtained in front of, behind, or any degree in-between, from the vehicle 404 and thus may not include image data representing the vehicle itself. In some examples, a portion of vehicle 404 may be included in image data 420.

Image data 420 may comprise a digital photograph or a digital graphic that is indicative of environment 400. Image data 420 may include any data format capable of organizing and storing a photographic image and/or graphic image as a digital file, may encompass various types of data, may be of various file formats, and may be stored to various mediums, whether those types of data, file formats, and mediums are known or have yet to be developed. In the example shown in FIG. 4B, image data 420 may include road 402 and lanes 402a, 402b, oil spill 408, truck 410, and cones 412. Image data 420 may also include image data detailing each of the components of the environment. For example, image data 420 may include data indicative of the street lines of road 402 and any other details that define road 402 (e.g., textures, colors, lighting etc.). In other examples, image data 420 may include location information associated with each component of environment 400. For example, image data 420 may include location information indicative of a location of truck 410 and cones 412.

Block 304 includes comparing environmental information indicative of the lane of travel to the image data to determine a portion of the image data that corresponds to the lane of travel. The environmental information may be any information that accurately defines a lane of travel of the environment that was known or received by the vehicle prior to obtaining the image data. For example, referring to FIG. 4A, the environmental information may include an image map that defines boundaries for lanes of travel 402a, 402b, among other things. The environmental information may include any other information as well. Generally, the environmental information may include information indicating any known structures, signs, or other features (both permanent and non-permanent) present in environment 400 prior to obtaining the image data.

In some examples, the environmental information may be obtained by vehicle 404 periodically to ensure the environmental information remains accurate. In other examples, the environmental information may be received periodically by vehicle 404 from a server. For example, a third party entity may continuously monitor environment 400 and may provide updates when, for example, structural changes (e.g., changes to the permanent features noted above) may occur. The update may be provided, for example, in the form of an updated image map. Other updates may be provided as well.

Figure 4C:
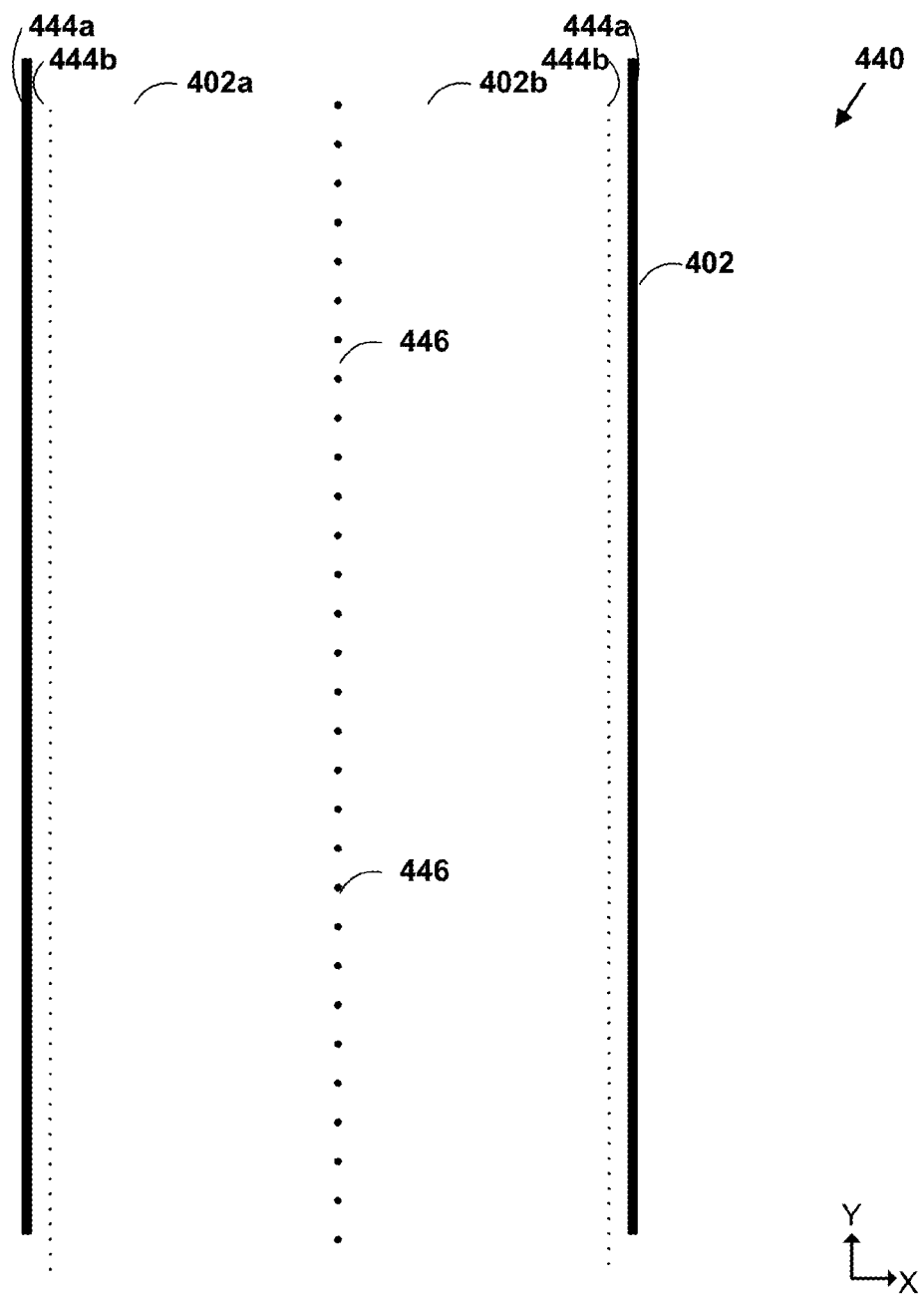
FIG. 4C is a schematic illustration of example environmental information obtained by the autonomous vehicle of FIG. 4A, in accordance with an example embodiment.

FIG. 4C illustrates an example image map 440 that is indicative of the environment 400. In FIG. 4C the image map 440 may include a location of road 402 (e.g., a longitude and latitude, or a cardinal direction), a location of lanes 402a, 402b, a boundary 444a of road 402, and a boundary 444b, 444a of each lane 402a, 402b. Image map 440 may also include a center boundary 446 of road 402 that divides lanes 402a and 402b. Other information may be included in the image map as well. In example image map 440 illustrated in FIG. 4C, there are no permanent structures or non-permanent structures on road 402 as of the time the image map was created.

Using the information from image map 440, a portion of the image data may be determined that corresponds to the lane of travel vehicle 404 is substantially traveling in, or in this case, lane 402b. The portion of the image data that corresponds to the lane of travel may be determined by mapping (or projecting) the obtained image map into the image data of the environment and using the location information corresponding to the lane of travel in the image map to determine its corresponding location in the image data. The mapping may be performed using a known position of vehicle 404 and a known camera transform of camera 130 that obtained the image data 420. In other words, using information such as the location of road 402, the location of lanes 402a, 402b, the boundary 444a of road 402 and the boundaries 444a, 444b of each lane 402a, 402b lane extents and lane lines may be projected into the image data 420. In other examples, the portion of the image data may be determined based on the heading of the vehicle. Many techniques can be used to project the lane extents from the image map into the image data and are generally known in the art.

Figure 4D:
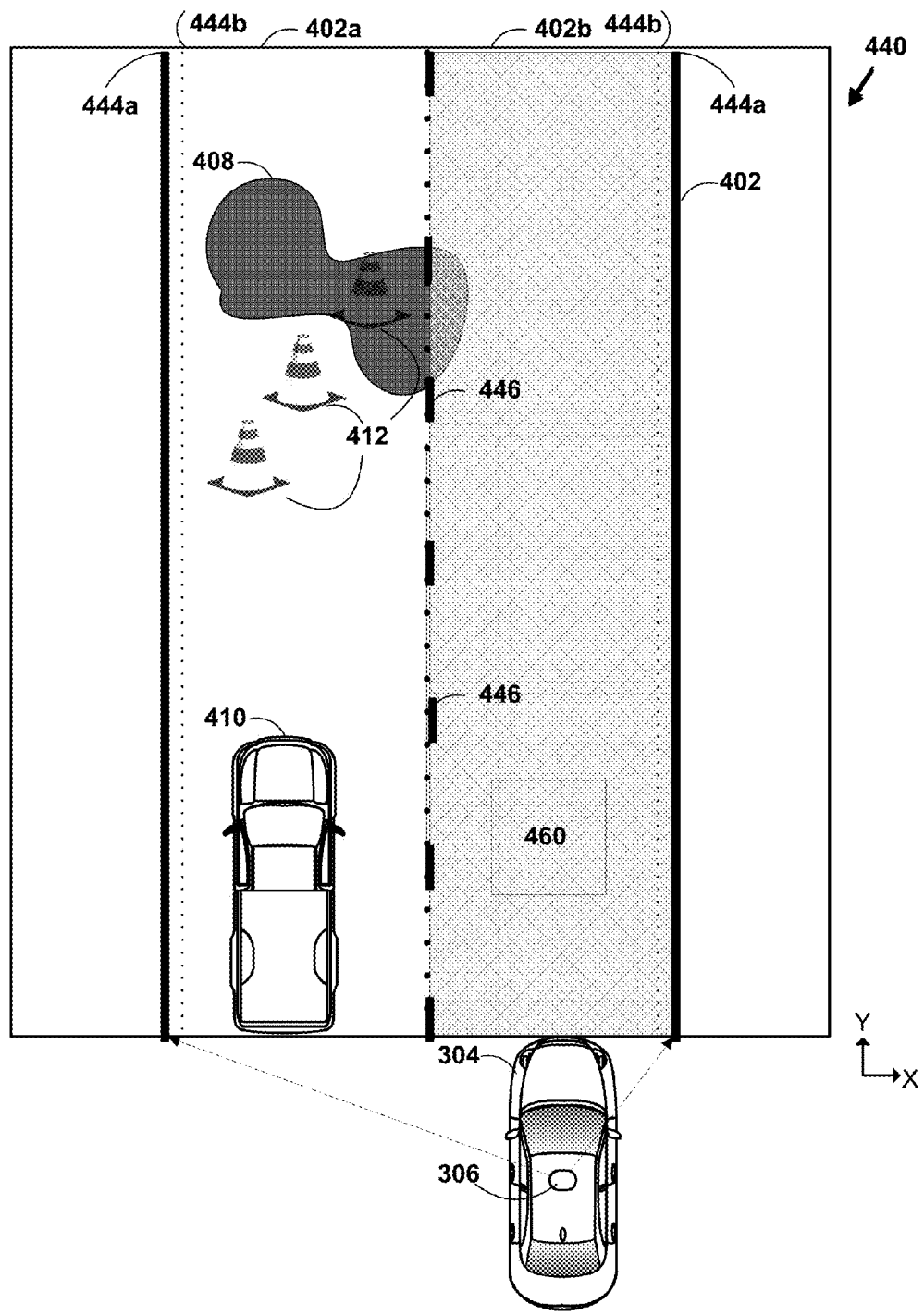
FIG. 4D is a schematic illustration of the example environmental information of FIG. 4C being compared to the image data of FIG. 4B, in accordance with an example embodiment.

FIG. 4D illustrates image data 420 with image map 440 overlaying it and lane extents projected on it. As shown in FIG. 4D, the dotted lines from image map 440 are projected into image data 440.

Figure 4E:
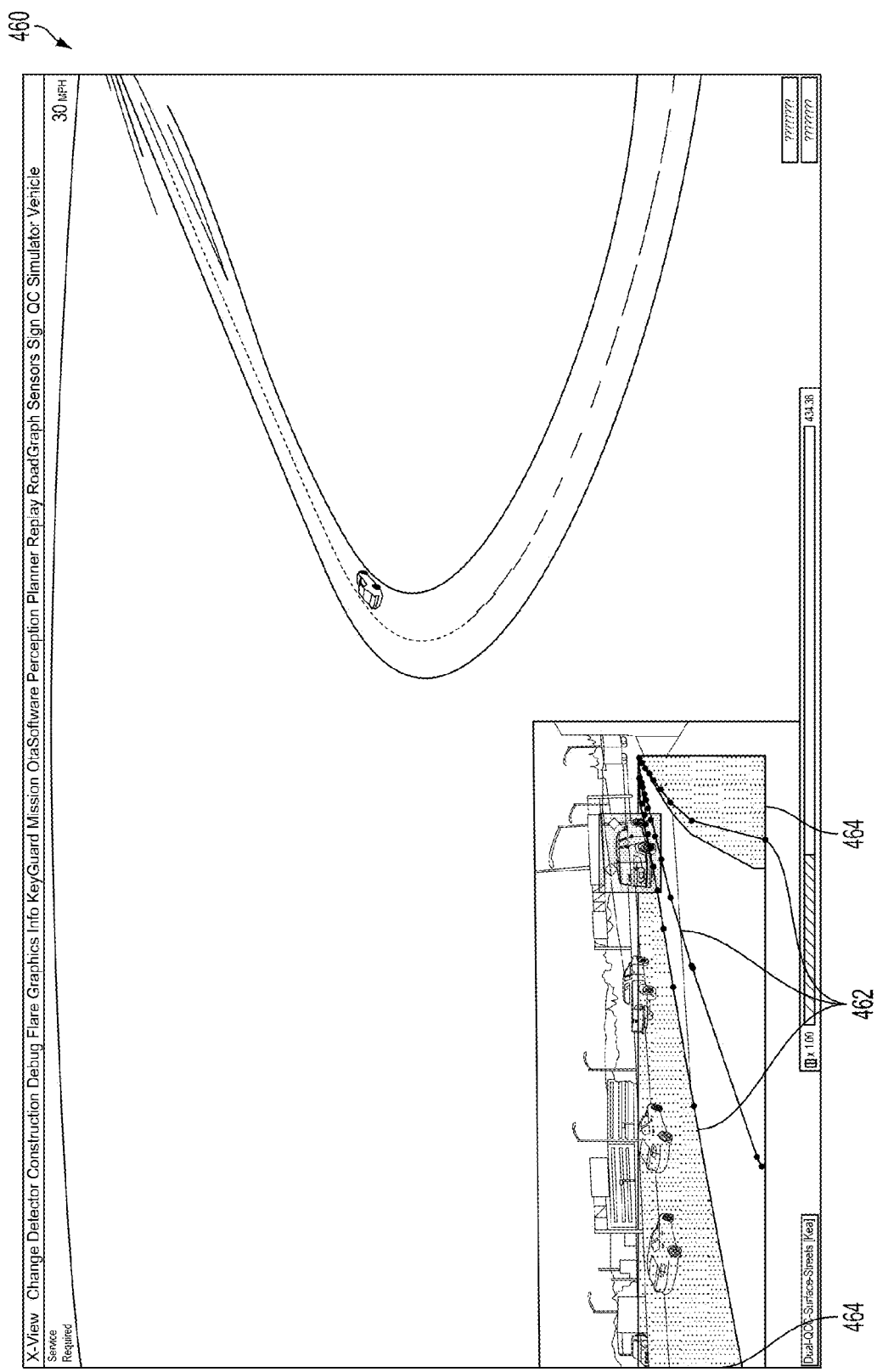
FIG. 4E is schematic illustration of example three-dimensional (3D) environmental information being compared to example 3D image data, according to an example embodiment.

Note, for illustrative purposes environment 400 (whether captured as image data 420 or image map 440) illustrated in FIGS. 4A, 4B, 4D, and 4F are described in the two-dimensional x-y plane. However, it is noted that more complete three-dimensional image data may be obtained by either adjusting a camera of sensor unit 406 of vehicle 404 up or down from the x-y plane. Moreover image maps depicting environment 400 may be three-dimensional and may be projected on image data 420 in a three-dimensional manner, such as, for example, shown in FIG. 4E. Similar to FIG. 4D, in FIG. 4E, lane extents 462 may be projected into the image data 460.

Based on the projection, a vehicle may determine which portion of the image data represents the lane of travel. For example, vehicle 404 may determine what portions of image data 420 represent lane 402b, which vehicle 404 is currently operating in. Processing image data in this manner may allow vehicle 404 to reduce the amount of processing by not processing all of the image data, but instead focusing on the portion of the oil spill 408 that is within lane 402b. Otherwise vehicle 404 may process truck 410 and cones 412 despite the fact that truck 410 and cones 412 are not relevant to the heading of vehicle 404 or in the lane of travel of vehicle 404.

Once the portion of the image data representing the lane of travel has been determined, at block 306, method 300 includes determining whether an object is present in the lane of travel based on the portion of the image data that corresponds to the lane of travel of the environment and by disregarding a remaining portion of the image data. The remaining portion of the image data may be any image data that does not correspond to the lane of travel. In other words, vehicle 404 may process only the portion of the image data that corresponds to the lane of travel and ignore any other portions of the image data. Processing the image data in this manner may significantly reduce the processing time and/or complexity of processing. The object may be any object in the lane of travel of the vehicle, but may be unknown to the vehicle. Example objects may be obstacles (e.g., cones, wreckage, etc.), other vehicles, or pedestrians to name a few. To perform the detection, the vehicle (or computing device of the vehicle) may determine a portion of the image data, within the portion of the image data representing the lane of travel, indicative of a known object or structure and may compare it to the portion of the image data that includes an unknown structure.

For example, shown in FIG. 4D, knowing the location of lane of travel 402b, vehicle 404 may process an initial portion 460 of the lane to determine a known structure of the lane. For example, vehicle 404 may process initial portion 460 of the lane to determine a shading, color, color intensity etc. and may thereafter process the remainder of the lane to compare the determined attributes (e.g., determine a likeness of shading) to make the determination.

The comparison may include, for example, comparing one or more variables including color average, color-intensity, shadow presence, variation of color-intensity, or variation of color of the known structure with one or more of color average, color-intensity, shadow presence, variation of color-intensity, or variation of color of the unknown object. In other examples, any other known or standard image processing feature descriptors may be used to describe the known area. Such examples may include corner detectors, edge detectors, blob detectors, ridge detectors, gradient detectors, etc. In practice, the distributions defining the known structure and the unknown structure may be computed, and from the distributions such variables may be determined and compared. For example, Gaussian distributions may be calculated that represent the pixels that define the color-intensity of the known structure and may be compared to Gaussian distributions representing pixels in the image data that define color-intensity of the unknown object to determine a likeness of the pixels. Any of the above-noted variables may be defined as a distribution and used in the comparison.

In some examples, once the information indicative of the appearance of the known structure and the unknown object have been determined, the comparison may be made automatically, for example, using a computer system such as computer system 112. In other examples, the comparison may be processed external to the vehicle and provided to the vehicle upon completion.

Once the determination has been made, at block 308, method 400 includes based on the determination, providing instructions to control the vehicle in the autonomous mode. The vehicle may, for example, be controlled to avoid obstacles or vehicles that may be stopped in the current lane of the vehicle. In the example depicted in FIGS. 4A-4C, vehicle 404 may be controlled to safely avoid the portion of oil spill 408 that is within the current lane of travel 402b.

Figure 3B:
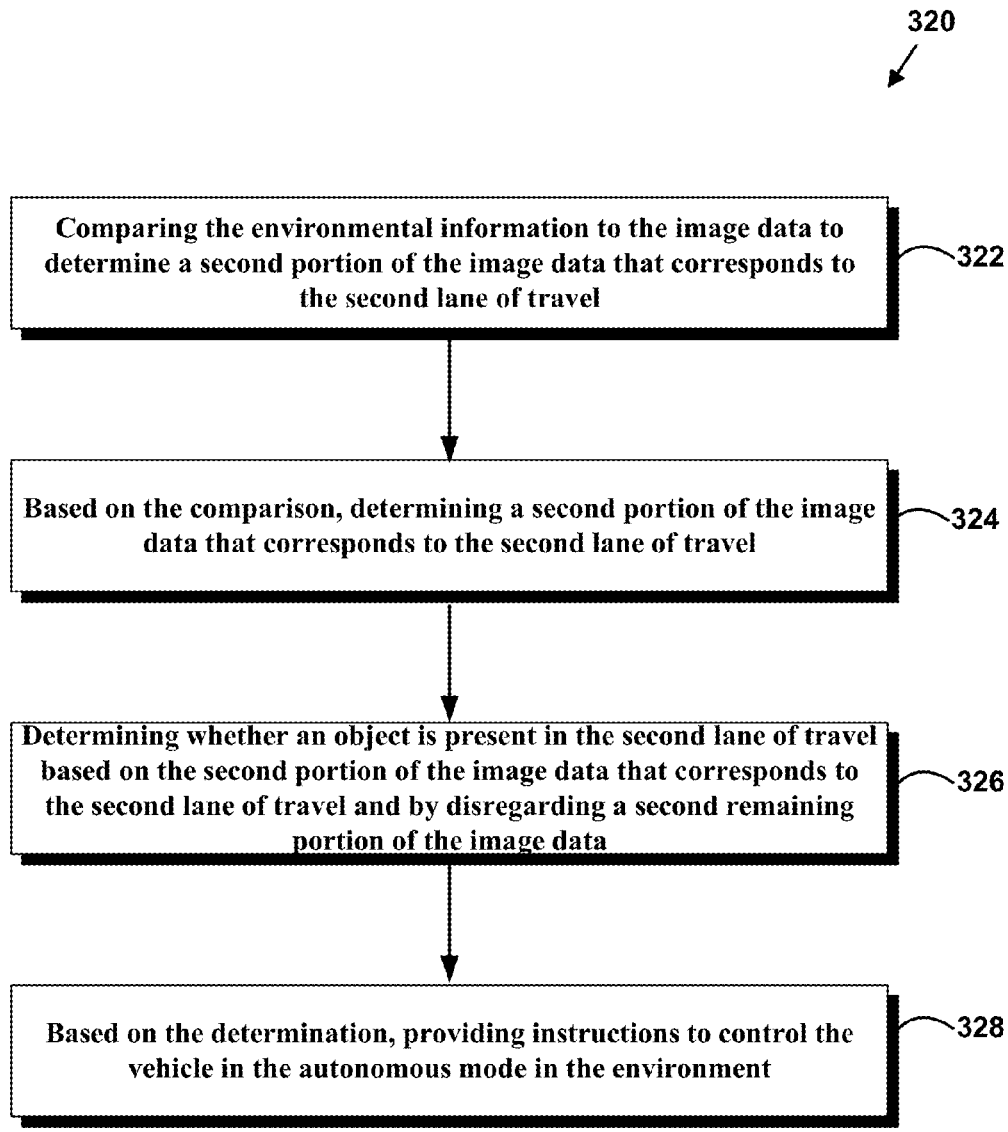
FIG. 3B illustrates another block diagram of a method, in accordance with an example embodiment.

FIG. 3B illustrates another method 320 provided for using known environmental information to facilitate object detection through image processing. Initially, at block 322, method 320 includes comparing the environmental information to the image data to determine a second portion of the image data that corresponds to a second lane of travel. The second lane of travel may be similar to the lane of travel discussed with reference to method 300, but may be different. For example, referring to FIG. 4A, the second lane of travel may be included in environment 400, but may be different than lane of travel 402a. For example, the second lane of travel may be a lane of travel adjacent to that of lane 402a such as 402b. In other examples, the second lane of travel may be a lane of travel on road 402, but may be a one or two lanes away from original lane 402.

At block 324, method 320 includes based on the comparison determining a second portion of the image data that corresponds to the second lane of travel. The second portion of the image data that corresponds to the second lane of travel may be determined in the same manner as discussed with reference to method 300 at step 304.

At block 326, method 320 includes determining whether an object is present in the second lane of travel based on the second portion of the image data that corresponds to the second lane of travel of the environment and by disregarding a second remaining portion of the image data. The second remaining portion of the image data may include image data other than the second portion of the image data that corresponds to the second lane of travel. Such a determination may be made in the same manner as discussed with reference to method 300 at step 306.

At block 328, method 320 includes based on the determination, providing instructions to control the vehicle in the autonomous mode in the environment. The instructions may be provided and the vehicle may be controlled in the same manner as discussed with reference to method 300 at step 308.

Note, while methods 300 and 320 described above focus on activity of a vehicle operating in a "lane of travel," this is meant only to be an example. The above described methods may also be used to focus attention on other areas of an environment that are relevant to a task a vehicle may be performing. For example, in other applications a vehicle may be interested only in looking for objects on a sidewalk, a shoulder, or a cross walk, or where the vehicle expects to see signs, etc. Accordingly, the vehicle may use methods 300 and 320 in a similar fashion to detect objects in other areas or portions of interest in the environment.

Example methods, such as method 300 of FIG. 3A or method 320 of FIG. 3B may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
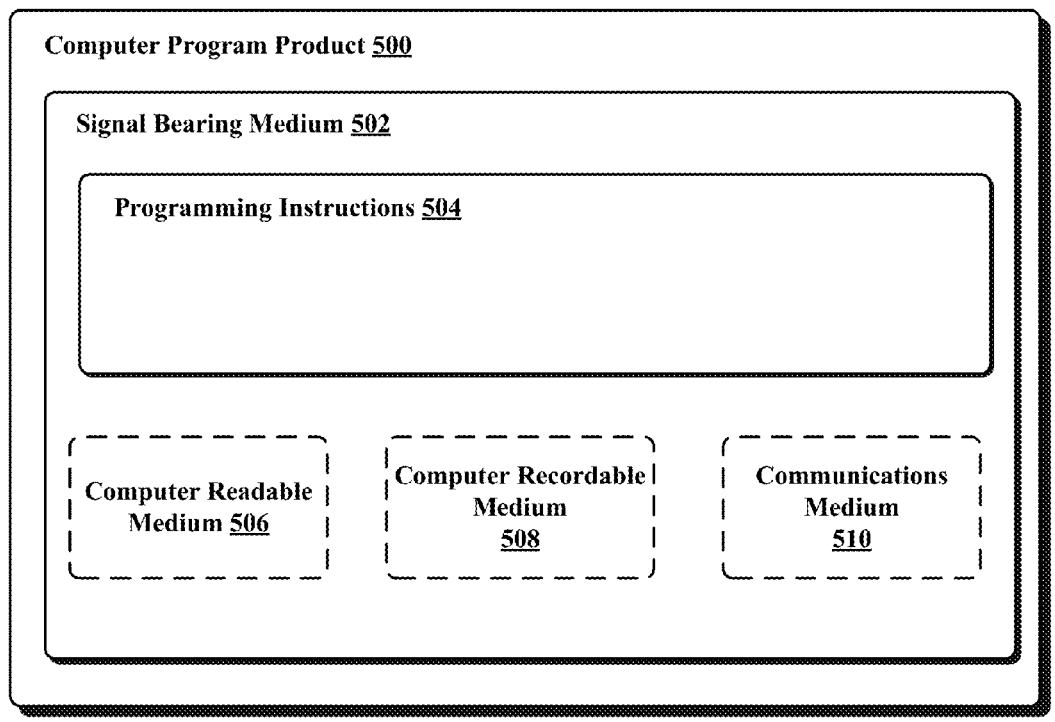
FIG. 5 is a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A method comprising:
   receiving, using a processor, image data indicative of an environment from at least one sensor of a vehicle, wherein the vehicle is configured to operate in an autonomous mode in the environment, and wherein the vehicle is substantially in a lane of travel of the environment;
   comparing the image data to a predetermined image map of a road in the environment indicative of the lane of travel;
   based on the comparing, determining a portion of the image data that corresponds to the lane of travel and disregarding a remaining portion of the image data;
   performing object detection based on only the determined portion of the image data; and
   providing instructions to control the vehicle in the autonomous mode in the environment based on the performed object detection.

2. The method of claim 1, wherein the comparing comprises projecting the predetermined image map onto the image data.

3. The method of claim 1, wherein the predetermined image map indicates at least one of a location of the lane of travel or a boundary of the lane of travel, and
wherein comparing the predetermined image map to the image data further comprises:
comparing the image data to at least one of (i) the location of the lane of travel indicated by the predetermined image map, or (ii) the boundary of the lane of travel indicated by the predetermined image map.

4. The method of claim 1, wherein the portion is a first portion, wherein the lane of travel is a first lane of travel, wherein the predetermined image map of the road in the environment is further indicative of a second lane of travel of the environment, and the method further comprises:
based on the comparing, determining a second portion of the image data that corresponds to the second lane of travel, wherein the second portion of the image data is different than the first portion of the image data, wherein the second lane of travel of the environment is different than the first lane of travel, and wherein the disregarded remaining portion of the image data includes image data other than the first and second portions;
performing additional object detection based on only the first and second portions of the image data; and
providing instructions to control the vehicle in the autonomous mode in the environment based on the performed additional object detection.

5. The method of claim 4, wherein the predetermined image map indicates at least one of a location of the second lane of travel or a boundary of the second lane of travel, and
wherein comparing the predetermined image map to the image data comprises:
comparing the image data to at least one of (i) the location of the second lane of travel indicated by the predetermined image map, or (ii) the boundary of the second lane of travel indicated by the predetermined image map.

6. The method of claim 4, wherein the second lane of travel is adjacent to the first lane of travel.

7. The method of claim 1, wherein the predetermined image map comprises a heading of the vehicle in the environment.

8. The method of claim 1, wherein determining the portion of the image data that corresponds to the lane of travel comprises determining the portion of the image data to be a portion of the image data that includes features that correspond to predetermined features, indicated in the predetermined image map, that are associated with known lane boundaries of the lane of travel.

9. A vehicle comprising:
at least one sensor configured to receive image data indicative of an environment, wherein the vehicle is configured to operate in an autonomous mode in the environment, and wherein the vehicle is substantially in a lane of travel of the environment;
a computer system, wherein the computer system is configured to:
compare the image data to a predetermined image map of a road in the environment indicative of the lane of travel;
based on the comparing, determine a portion of the image data that corresponds to the lane of travel and disregarding a remaining portion of the image data;
perform object detection based on only the determined portion of the image data; and
provide instructions to control the vehicle in the autonomous mode in the environment based on the performed object detection.

10. The vehicle of claim 9, wherein the comparing comprises projecting the predetermined image map onto the image data.

11. The vehicle of claim 9, wherein the predetermined image map indicates at least one of a location of the lane of travel or a boundary of the lane of travel, and
wherein comparing the predetermined image map to the image data further comprises:
comparing the image data to at least one of (i) the location of the lane of travel indicated by the predetermined image map, or (ii) the boundary of the lane of travel indicated by the predetermined image map.

12. The vehicle of claim 9, wherein the portion is a first portion, wherein the lane of travel is a first lane of travel, wherein the predetermined image map of the road in the environment is further indicative of a second lane of travel of the environment, and the computer system is further configured to:
based on the comparing, determine a second portion of the image data that corresponds to the second lane of travel, wherein the second portion of the image data is different than the first portion of the image data, wherein the second lane of travel of the environment is different than the first lane of travel, and wherein the disregarded remaining portion of the image data includes image data other than the first and second portions;
perform additional object detection based on only the first and second portions of the image data; and
provide instructions to control the vehicle in the autonomous mode in the environment based on the performed additional object detection.

13. The vehicle of claim 12, wherein the predetermined image map indicates at least one of a location of the second lane of travel or a boundary of the second lane of travel, and
wherein comparing the predetermined image map to the image data comprises:
comparing the image data to at least one of (i) the location of the second lane of travel indicated by the predetermined image map, or (ii) the boundary of the second lane of travel indicated by the predetermined image map.

14. The vehicle of claim 12, wherein the second lane of travel is adjacent to the first lane of travel.

15. A non-transitory computer readable medium having stored therein instructions that when executed by a computer system in a vehicle, cause the computer system to perform functions comprising:
receiving image data indicative of an environment from at least one sensor of the vehicle, wherein the vehicle is configured to operate in an autonomous mode in the environment, and wherein the vehicle is substantially in a lane of travel of the environment;
comparing the image data to a predetermined image map of a road in the environment indicative of the lane of travel;
based on the comparing, determining a portion of the image data that corresponds to the lane of travel and disregarding a remaining portion of the image data;
performing object detection based on only the determined portion of the image data; and
providing instructions to control the vehicle in the autonomous mode in the environment based on the performed object detection.

16. The non-transitory computer readable medium of claim 15, wherein the comparing comprises projecting the predetermined image map onto the image data.

17. The non-transitory computer readable medium of claim 15, wherein the predetermined image map indicates at least one of a location of the lane of travel or a boundary of the lane of travel, and
wherein comparing the predetermined image map to the image data further comprises:
comparing the image data to at least one of (i) the location of the lane of travel indicated by the predetermined image map, or (ii) the boundary of the lane of travel indicated by the predetermined image map.

18. The non-transitory computer readable medium of claim 15, wherein the predetermined image map comprises a heading of the vehicle in the environment.

19. The non-transitory computer readable medium of claim 15, wherein the portion is a first portion, wherein the lane of travel is a first lane of travel, wherein the predetermined image map of the road in the environment is further indicative of a second lane of travel of the environment adjacent to the first lane of travel, and the instructions are further executable by the computer system in the vehicle to cause the computer system to perform functions comprising:
based on the comparing, determining a second portion of the image data that corresponds to the second lane of travel, wherein the second portion of the image data is different than the first portion of the image data, wherein the second lane of travel of the environment is different than the first lane of travel, and wherein the disregarded remaining portion of the image data includes image data other than the first and second portions;
performing additional object detection based on only the first and second portions of the image data; and
providing instructions to control the vehicle in the autonomous mode in the environment based on the performed additional object detection.

20. The non-transitory computer readable medium of claim 19, wherein the predetermined image map indicates at least one of a location of the second lane of travel or a boundary of the second lane of travel, and
wherein comparing the predetermined image map to the image data comprises:
comparing the image data to at least one of (i) the location of the second lane of travel indicated by the predetermined image map, or (ii) the boundary of the second lane of travel indicated by the predetermined image map.

* * * * *